Sept. 5, 1950     L. P. C. J. DUDLEY     2,521,154
METHOD OF AND MEANS FOR MAKING STEREOSCOPIC
X-RAY PHOTOGRAPHS
Filed Nov. 1, 1945

INVENTOR
LESLIE P. C. J. DUDLEY

Emery, Holcombe & Blair
ATTORNEYS

Patented Sept. 5, 1950

2,521,154

UNITED STATES PATENT OFFICE 2,521,154

METHOD OF AND MEANS FOR MAKING STEREOSCOPIC X-RAY PHOTOGRAPHS

Leslie Peter Clarence Jack Dudley, Twickenham, England, assignor to Stereoptics Limited, London, England, a British company Application November 1, 1945, Serial No. 626,144
In Great Britain November 11, 1944

12 Claims. (Cl. 250—60)

This invention relates to methods of and means for providing stereoscopic X-ray photographs, or, as they are termed in the art, stereoscopic radiographs, of the integral or parallax panoramagram type and of the parallax stereogram type.

In British specification No. 564,490 there are described methods of making stereoscopic radiographs involving the use of a radiographic grid, that is a grid composed of fine, parallel strips of a material which is opaque to X-radiation, separated by strips which are transparent to X-radiation.

One of the objects of the present invention is to provide a method which does not necessitate the use of a radiographic grid.

A further object is to enable stereoscopic radiographs to be produced on films or plates of small dimensions such as in, for example, the radiographic method commonly known as "mass radiography."

According to the present invention there is provided a method of making stereoscopic radiographs wherein the subject is exposed to a source of X-radiation, provision is made for presenting the required different aspects of the subject to the said radiation, a suitable screen, such as a fluorescent surface, is provided for receiving the radiation after it has passed through the subject so as to form an image capable of being photographically recorded, and means are provided for photographically recording said image, said means being associated with an optical grid composed of fine strips of a material which is opaque to light alternating with strips which are transparent to light and said optical grid being moved in a direction transversely to the grid strips and parallel to the light sensitive surface, the movement of the optical grid being similar to that adopted in making stereoscopic photographs by certain known methods and the correlation between said grid movement and the relative movement between the subject and the source of X-radiation being similar to the correlation between the movement of the grid and the relative movement between the subject and the camera in such methods.

A stereoscopic X-ray photograph in accordance with the present invention may be viewed directly through a grid, the viewing grid having the same pitch as the above mentioned optical grid. Alternatively the image may be recorded on a small film or plate and then projected to an enlarged scale on to a screen, the projected image then being viewed through a viewing grid having a pitch which matches that of the strips of which the image is constituted.

The photographic recording means employed in carrying out the present invention may comprise a camera of the still or kinematographic kind.

A further possibility would be to dispose a photographic grid in close proximity to the screen and a sensitised photographic film or plate in close proximity to the grid on the side remote from the screen for the purpose of recording the image on said sensitised surface without the aid of a camera. In the latter method it would be desirable to protect the photographic film or plate from the effects of X-radiation penetrating the fluorescent screen by interposing a suitable filter of, for example, lead glass between the said screen and the photographic film or plate.

In cases where a photographic camera is employed in carrying out the present invention the grid associated with such camera may be embodied therein or such grid may be disposed between the camera and the screen, preferably in close proximity to the latter. In both cases the photographic apparatus may be protected against adverse influence by X-radiation by the use of mirrors, prisms or the like so that only a reflected and/or refracted image reaches the apparatus and/or by the use of a filter for example of lead-glass.

For the purpose of attaining the necessary relative movement between the source of X-radiation and the subject the subject may be moved in the manner described in British specification No. 564,490 or alternatively the subject may remain stationary whilst the source of radiation be moved. For optimum results however movement of the source of radiation necessitates corresponding movement of the screen and of the grid and photographic recording means and the first mentioned procedure is therefore in general preferable.

In order that the present invention may be well understood I will now describe, by way of examples only, two specific modes of carrying out such invention with reference to the accompanying drawings in which.

Figure 1:
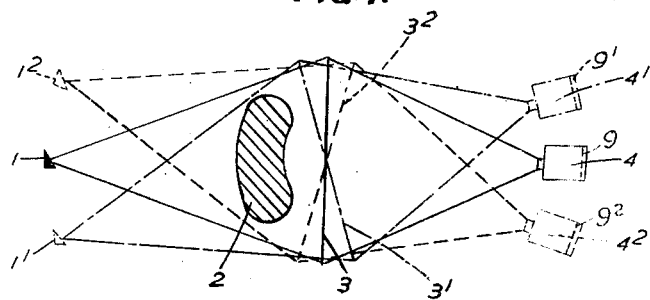
Figure 1 is a plan view showing diagrammatically one arrangement.

Referring to Figure 1, reference numeral 1 denotes a source of X-radiation, 2 denotes the subject to be X-rayed, 3 denotes a fluorescent screen and 4 denotes a camera.

Means are provided for moving the source of radiation, e. g. an X-ray tube, from the position designated $1^1$ to the position designated $1^2$ and means are also provided for moving the screen 3 from the position designated 3¹ to the position designated 3² so that the central ray of the cone of rays emanating from the source remain normal to the screen throughout the said movement. Similarly the camera 4 is moved from the position designated 4¹ to the position designated 4² so that the optical axis of the camera likewise remains normal to the screen.

The aforesaid camera 4 may be of any type suitable for making photographic parallax panoramagrams or parallax stereograms. Thus it may for example include an optical grid having fine transparent strips alternating with opaque strips and means for moving such grid in a direction at right angles to the direction of the grid strips as indicated diagrammatically at 9, 9¹ and 9² in Figure 1. Alternatively the necessary grid may be disposed between the camera proper and the screen 3, preferably closely adjacent to the said screen.

Figure 2:
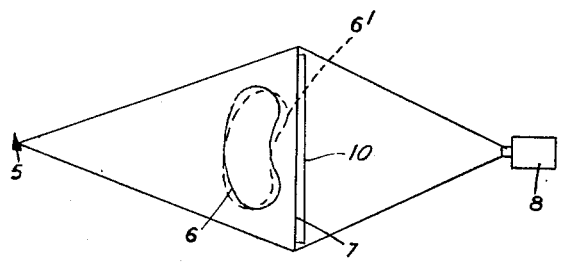
Figure 2 is a plan view showing diagrammatically another arrangement.

The arrangement shown in Figure 2 is of a simpler and accordingly preferable nature. Instead of generating the required relative movement between the source of X-radiation and the subject by moving the said source, the source, designated 5, remains stationary and the subject 6 is moved in the required sense say from the position shown in full lines to the dotted line position designated 6¹, the fluorescent screen 7, the camera 8 and the optical grid 10 also remaining stationary. The required movement of the subject may be effected with the aid of the apparatus described in the above mentioned earlier specification.

Assuming that a radiograph of the parallax panoramagram type is required the aforesaid camera (4 or 8) preferably makes a continuous exposure whilst the optical grid is in motion and during this exposure the relationship between the subject and the source of radiation is changed, in the case of the arrangement shown in Figure 1 by moving the source from 1¹ to 1² and in the case of the arrangement shown in Figure 2 by moving the subject from the position shown in full lines to the position designated 6¹. In this way a progressively changing image is formed on the fluorescent screen and recorded by the camera in the form of a parallax panoramagram. In a modified method, instead of making a continuous exposure a series of separate exposures may be made each with the subject and the source of radiation in different relative positions, the grid or the plate or film being caused to move through a distance equal to the width of one opaque strip of the grid while the subject or the source of radiation as the case may be is caused to move between its two extreme positions.

Assuming that a radiograph of the parallax stereogram type is required, each radiograph consists of two views only, one representing a "right eye" view and the other representing a "left eye" view. The relative movement between the subject and the source of radiation takes place between the exposures and there is, consequently, no necessity for simultaneous movement of the grid and of the subject or source of radiation.

In the production of radiographs of the parallax panoramagram kind the photographic grid preferably comprises opaque strips which are of somewhat greater width than that of the transparent strips but in the production of radiographs of the parallax stereogram type the grid should be composed of opaque strips and transparent strips of the same or substantially the same width. In both cases the total movement imparted to the grid, i. e. the total movement during the production of either a parallax panoramagram or a parallax stereogram should be equal to the width of one opaque strip, such movement being at right-angles to the longitudinal axes of the grid strips and parallel to the plane of the sensitized surface on which the image is to be photographically recorded.

Whilst I have hereinbefore described two specific methods of carrying out the present invention I wish it to be understood that various modifications are possible without departing from the scope of such invention. It is also to be understood that any suitable photographic apparatus, e. g. apparatus already known for use in making stereoscopic photographs of the parallax stereogram or parallax panoramagram kind may be employed in carrying out this invention.

I claim:

1. A method of making stereoscopic X-ray photographs wherein the subject is exposed to a source of X-radiation, relative movement is established between the source of radiation and said subject so as to present the required different aspects of the subject to radiation, the radiation after passing through the subject is caused to impinge on a screen, for example a fluorescent screen, so forming an image, and a photographic record is made of said image on a light-sensitive surface through an optical grid coextensive with said image and composed of parallel strips of a material which is opaque to light alternating with strips which are transparent to light, the said grid being moved in a direction transversely with respect to the longitudinal axes of the grid strips and parallel to the plane of the light-sensitive surface through a distance equal to the width of one opaque strip of the grid, and the relative movement between the source of X-radiation and the subject being in a direction substantially at right-angles to the longitudinal axes of the said grid strips.

2. A method of making stereoscopic X-ray photographs wherein the subject is exposed to a source of X-radiation, relative movement between the said subject and the said source of radiation is effected by moving the subject with respect to the source and thus presenting the required different aspects of the subject to radiation, the radiation after passing through the subject is caused to impinge on a screen of the fluorescent type so forming an image, and a photographic record is made of said image on a light-sensitive surface through an optical grid coextensive with said image and composed of parallel strips of a material which is opaque to light alternating with strips which are transparent to light, the said grid being moved in a direction transversely with respect to the longitudinal axes of the grid strips and parallel to the plane of the light-sensitive surface through a distance equal to the width of one opaque strip of the grid, and the relative movement between the source of X-radiation and the subject being in a direction substantially at right angles to the longitudinal axes of the said grid strips.

3. A method of making stereoscopic X-ray photographs wherein the subject is exposed to a source of X-radiation, the radiation after passing through the subject is caused to impinge on a screen of the fluorescent type so forming an image, a light-sensitive surface is positioned for making a photographic record of said image, an optical grid coextensive with said image and composed of parallel strips of a material which is opaque to light alternating with strips which are transparent to light is interposed between the said screen and the said light-sensitive surface, the said grid is moved in a direction transversely with respect to the longitudinal axes of the grid strips and parallel to the plane of the light-sensitive surface through a distance equal to the width of one opaque strip of the grid, the source of X-radiation is moved with respect to the subject in a direction at right-angles to the longitudinal axes of the grid strips, the screen is moved in unison with movements of the said source of X-radiation so that the central ray of the cone of rays emanating from the source remains normal to the screen, and the optical grid is caused to move so as to remain parallel with respect to the said screen.

4. Apparatus for making stereoscopic X-ray photographs wherein the subject is exposed to a source of X-radiation and the radiation after passing through the subject is caused to impinge on a screen so as to form an image, said apparatus including a source of X-radiation and a screen of the fluorescent type, means for movably supporting the subject between said source of radiation and screen, a camera presenting a light-sensitive surface adapted to be positioned for making a photographic record of an image on said screen on said camera light-sensitive surface, an optical grid coextensive with said image and composed of parallel strips of a material which is opaque to light alternating with strips which are transparent to light interposed between said screen and said camera light-sensitive surface, means for moving said grid in a direction transversely with respect to the longitudinal axes of the grid strips and parallel to the plane of the light-sensitive surface through a distance equal to the width of one opaque strip of the grid, and means for causing relative movement between the subject and the said source of X-radiation in a direction at right-angles to the longitudinal axes of the grid strips.

5. Apparatus as claimed in claim 4 wherein the camera employed is of a kind having a rapidly moving shutter for exposing the light sensitive surface simultaneously over its entire area suitable for making a cinematographic record.

6. Apparatus as claimed in claim 4 wherein the optical grid is located between the camera and the said screen in close proximity to the latter.

7. A method as claimed in claim 1 wherein a filter having characteristics of a lead-glass filter is inserted between the screen and the means for making a photographic record so as to protect the latter against adverse influence by the X-radiation.

8. A method as claimed in claim 1 wherein optical means of the type of mirrors and prisms are located between the screen and the photographic recording means whereby the optical rays are bent towards the photographic recording means whilst the X-radiation proceeds in such a direction that it does not impinge on said recording means.

9. A method of making stereoscopic X-ray photographs wherein the subject is exposed to a source of X-radiation, the radiation after passing through the subject is caused to impinge on a screen so as to form an image, a light-sensitive surface is positioned for making a photographic record of said image, an optical grid coextensive with said image and composed of parallel strips of a material which is opaque to light alternating with a material which is transparent to light is interposed between the said screen and the said light-sensitive surface, the said grid is moved continuously during the exposure of the subject to X-radiation in a direction transversely with respect to the longitudinal axes of the grid strips and parallel to the plane of the light-sensitive surface through a distance equal to the width of one opaque strip of the grid, and relative movement is caused between the source of X-radiation and the subject in a direction substantially at right-angles to the longitudinal axes of the grid strips, the said relative movement being effected during the said exposure.

10. A method of making stereoscopic X-ray photographs wherein the subject is exposed to a source of X-radiation, the radiation after passing through the subject is caused to impinge on a screen so as to form an image, a light-sensitive surface is positioned for making a photographic record of said image, an optical grid coextensive with said image and composed of parallel strips of a material which is opaque to light alternating with a material which is transparent to light is interposed between the said screen and the said light-sensitive surface, the said grid is moved in a direction transversely with respect to the longitudinal axes of the grid strips and parallel to the plane of the light-sensitive surface through a distance equal to the width of one opaque strip of the grid and relative movement is caused between the source of X-radiation and the subject in a direction substantially at right-angles to the longitudinal axes of the grid strips, the said subject undergoing two separate exposures to X-radiation each with the said subject in a different position with respect to the said source, and the said movement of the grid being effected between the making of the two exposures.

11. Apparatus for making stereoscopic X-ray photographs comprising a source of X-radiation, means for supporting a subject to be exposed to said radiation, means for causing relative movement between said source of X-radiation and said subject so as to expose to radiation the required different aspects of said subject, a screen of the fluorescent type disposed for receiving the radiation passing through the subject and so forming a fluoroscopic image, a light-sensitive surface disposed for making a photographic record of said image, an optical grid coextensive with said image and disposed between said screen and said light-sensitive surface, said grid comprising parallel strips of a material which is opaque to light alternating with strips which are transparent to light, means for moving said grid in a direction transversely with respect to the longitudinal axes of the grid strips and parallel to the plane of the light-sensitive surface through a distance equal to the width of one opaque strip of the grid, and means for causing relative movement between said source of X-radiation and said subject in a direction substantially at right-angles to the longitudinal axes of the said grid strips.

12. A method of making stereoscopic X-ray photographs wherein the subject is exposed to a source of X-radiation, comprising establishing relative movement between the source of radiation and said subject so as to present different aspects of the subject to radiation for stereoscopic effect, causing radiation after passing through the subject to impinge on a screen of the fluorescent type to form an image and making a photographic record of said image on a light-sensitive surface through an optical grid coextensive with said image and composed of parallel strips of a material which is opaque to light alternating with strips which are transparent to light, moving said grid in a direction transversely with respect to the longitudinal axes of the grid strips and parallel to the plane of the light-sensitive surface through a distance equal to the width of one opaque strip of the grid, the transverse movement of said grid and the relative movement between the source of X-radiation and the subject being correlated in a direction substantially at right-angles to the longitudinal axes of the said grid strips to produce a radiograph of the parallax type.

LESLIE PETER CLARENCE JACK DUDLEY.

REFERENCES CITED

The following references are of record in the file of this patent:

UNITED STATES PATENTS

| Number | Name | Date |
|---|---|---|
| 1,704,477 | Jacobson | Mar. 5, 1929 |
| 2,214,621 | Leishman | Sept. 10, 1940 |
| 2,318,983 | Winnek | May 11, 1943 |

FOREIGN PATENTS

| Number | Country | Date |
|---|---|---|
| 449,213 | Great Britain | June 23, 1936 |
| 556,837 | Great Britain | Oct. 25, 1943 |